United States Patent
Thummalapenta et al.

(10) Patent No.: US 10,241,904 B2
(45) Date of Patent: Mar. 26, 2019

(54) TEST COMPONENTS FACTORIZATION IN A BUILD SYSTEM

(71) Applicant: Microsoft Technology Licensing, LLC, Redmond, WA (US)

(72) Inventors: Suresh Thummalapenta, Bellevue, WA (US); Jacek Andrzej Czerwonka, Sammamish, WA (US); Shuvendu K. Lahiri, Sammamish, WA (US); Nikolaj Skallerud Bjorner, Woodinville, WA (US); August Shi, Urbana, IL (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 15/483,849

(22) Filed: Apr. 10, 2017

(65) Prior Publication Data
US 2018/0293159 A1    Oct. 11, 2018

(51) Int. Cl.
G06F 11/36    (2006.01)

(52) U.S. Cl.
CPC ...... *G06F 11/3692* (2013.01); *G06F 11/3664* (2013.01); *G06F 11/3688* (2013.01)

(58) Field of Classification Search
None
See application file for complete search history.

(56) References Cited

U.S. PATENT DOCUMENTS

| | | | | |
|---|---|---|---|---|
| 7,490,319 B2 * | 2/2009 | Blackwell | ........... | G06F 11/3664 717/124 |
| 8,132,056 B2 * | 3/2012 | Thakkar | .............. | G06F 11/3676 714/38.1 |
| 8,276,123 B1 * | 9/2012 | Deng | .................. | G06F 11/3688 714/37 |
| 8,589,884 B2 * | 11/2013 | Gorthi | ................. | G06F 11/3688 714/38.1 |
| 8,793,656 B2 | 7/2014 | Huang et al. | | |

(Continued)

OTHER PUBLICATIONS

Saifan, et al., "Regression Test—Selection Technique Using Component Model Based Modification: Code to Test Traceability", In International Journal of Advanced Computer Science and Applications, vol. 7, No. 4, Apr. 1, 2016, pp. 88-92.

(Continued)

*Primary Examiner* — Qing Chen
(74) *Attorney, Agent, or Firm* — Workman Nydegger

(57) ABSTRACT

The factorization of test components when performing component-level regression testing in iterative builds of a computing system that consists of many working components. Performance metrics for test components are maintained across multiple builds of the computing program. To perform factorization, multiple factorings of a test component are identified and evaluated until a suitable improvement in the maintained performance metric for each corresponding test component is achieved (e.g., via simulation). This may be performed, across multiple of the test components. This process may be iterated through such that the set of test components being factored and evaluated in a subsequent iteration may in fact be a test component created by factorization in a prior iteration. The net result is that the factorization achieves improvement in performance metrics of the test components.

20 Claims, 3 Drawing Sheets

(56) References Cited

U.S. PATENT DOCUMENTS

| | | | |
|---|---|---|---|
| 9,032,370 B2* | 5/2015 | Chakraborty | G06F 11/3672 714/809 |
| 2004/0154001 A1* | 8/2004 | Haghighat | G06F 11/3688 717/130 |
| 2005/0283664 A1* | 12/2005 | Coulter, Jr. | G06F 11/261 714/15 |
| 2008/0126867 A1 | 5/2008 | Pandarinathan et al. | |

OTHER PUBLICATIONS

Caliebe, et al., "Dependency-Based Test Case Selection and Prioritization in Embedded Systems", In Proceedings of IEEE Fifth International Conference on Software Testing, Verification and Validation, Apr. 17, 2012, 2 pages.

Musa, et al., "Regression Test Case Selection Prioritization Using Dependence Graph and Genetic Algorithm", In Journal of Computer Engineering, vol. 16, Issue 3, May 2014, pp. 38-47.

Elbaum, et al., "Techniques for improving regression testing in continuous integration development environments", In Proceedings of the 22nd ACM SIGSOFT International Symposium on Foundations of Software Engineering, Nov. 16, 2014, pp. 235-245.

Chandran, Annamariale, "Module Based Regression Test Selection Strategy for Web applications", https://www.google.co.in/url?sa=t&rct=j&q=&esrc=s&source=web&cd=2&cad=rja&uact=8&ved=0ahUKEwj9uri_w_rPAhVJQo8KHfioC54QFggkMAE&url=http%3A%2F%2Fwww.csi-india.org%2Fdocument_library%2FModule%2520Based%2520Regression%2520Test%2520Selectionb4fa.ppt&usg=AFQjCNFabDOoTur-0P_tC5piMKJfYo8G2w&bvm=bv.136811127,d.c2l.

Shameem, et al., "Dependency Detection for Regression Testing using Test Case Prioritization Techniques", In International Journal of Computer Applications, vol. 65, No. 14, Mar. 2013, pp. 20-25.

\* cited by examiner

TEST COMPONENTS FACTORIZATION IN A BUILD SYSTEM

BACKGROUND

Computing systems and associated networks have greatly revolutionized our world. Computing systems operate via the use of software, which includes instructions that instruct the hardware of a computing system to operate in particular ways. Software is often initially drafted using source code that has semantics that are more recognizable and readable to a trained human coder. A software "build" involves the construction of an observable and tangible result using the source code. For instance, the result of a software build might include standalone software artifacts that can be run on a computer, or might include software in an interpreted language.

Modern computer programs may be quite large, often involving more than a million lines of code and thousands of executable components (e.g., components, functions, objects, and the like). Build systems are often used in such large-scale software development projects. The build systems perform such tasks as managing the process of building source code, applying static analyzers, and executing tests.

Conventional build systems view a software project as a group of inter-dependent components and inherently perform regression test selection at the component level. The inter-dependent components including both working components and test components. The working components represent the actual program under development. The test components are used to ensure that the program still performs as expected at each stage of development. For instance, given a change in the working components, the build system uses a build dependency graph to identify test components that are impacted by the change and perform activities only using those test components. More specifically, whenever any dependency of a test component is impacted by the given change that is subjected to a build, all tests in that test component are executed. Otherwise, the test component is skipped and thus no tests in the test component are executed. This type of testing is often referred to as "module-level regression testing" (also called herein "component-level regression testing").

A major advantage of component-level regression testing is that this testing does not require any additional metadata beyond what was used to build in the first place. There are conventional build systems that keep metadata that define fine-grained dependencies like exercised statements for each test. This allows fewer tests to be performed because only those tests that impact the corresponding changed statement in a working component would be run—as opposed to running all tests that impact the entire changed component. However, for large software projects, storage and maintenance of this additional metadata adds non-trivial processing and storage overhead.

The subject matter claimed herein is not limited to embodiments that solve any disadvantages or that operate only in environments such as those described above. Rather, this background is only provided to illustrate one exemplary technology area where some embodiments described herein may be practiced.

BRIEF SUMMARY

At least some embodiments described herein relate to the factorization of test components when performing component-level regression testing in iterative builds of a computing system that consists of many working components. Performance metrics for test components are maintained across multiple builds of the computing program. To perform factorization, multiple factorings of a test components are identified and evaluated until a suitable improvement in the maintained performance metric for each corresponding test component is achieved (e.g., via simulation). This may be performed, across multiple of the test components. This process may be iterated through such that the set of test components being factored and evaluated in a subsequent iteration may in fact be a test component created by factorization in a prior iteration. Creation of a factored test component may involve actual creation of the factored test component, or could simply be the tracking of a representation of as yet non-existent test component and its proposed constituent tests, which is what is used to estimate whether the performance metric would be improved.

The net result is that the factorization achieves improvement in performance metrics of the test components. Accordingly, after subsequent iterative builds the testing performance (e.g., speed, complexity, reliability, and the like) may be improved. For large computing programs under build with many interrelated working components, and with many builds leading up to a finished product, this can result in accelerated development of the computer program.

For instance, this factorization may avoid over-testing that can result by executing large numbers of tests for a single test component, when some of the tests may not affect working components that have actually been changed during a build. The avoidance of over-testing also reduces the risk of false positives due to flaky tests that rely on dynamic state changes, which can also invoke the need for needless troubleshooting, only to find that there really is no problem with the computer program. In addition, since the factorization is achieved in the context of component-level regression testing, no further data beyond what is used to build is needed to test the build.

This summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

In order to describe the manner in which the above-recited and other advantages and features of the invention can be obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which:

FIG. 4A illustrates a state of the test components of FIG. 2 prior to a first stage of factorization;

FIG. 4B illustrates an example state of the test components of FIG. 2 after an example first incremental factorization; and FIG. 4C illustrates an example state of the test components of FIG. 2 after an example second incremental factorization.

DETAILED DESCRIPTION

Figure 1:
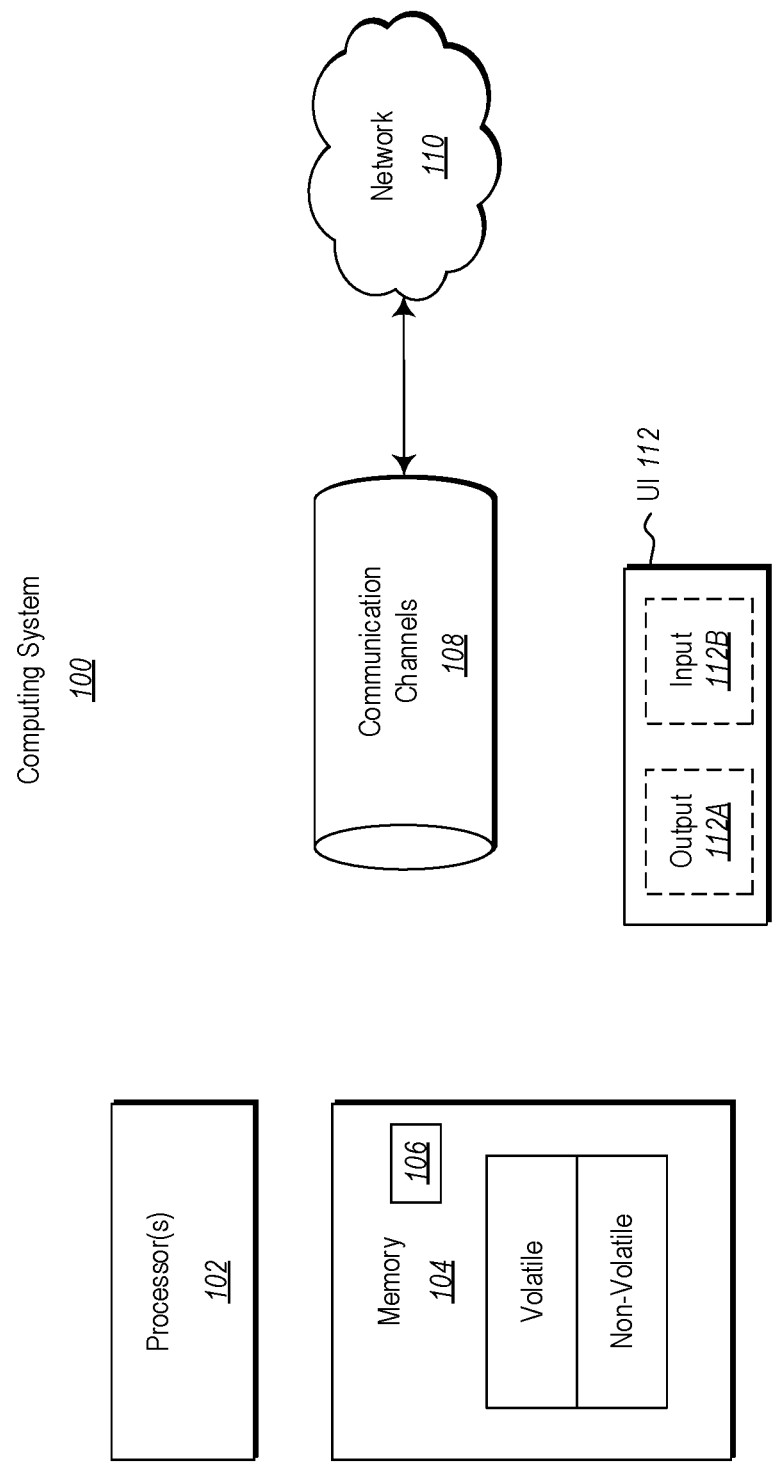
FIG. 1 illustrates an example computer system in which the principles described herein may be employed.

At least some embodiments described herein relate to the factorization of test components when performing component-level regression testing in iterative builds of a computing system that consists of many working components. Performance metrics for test components are maintained across multiple builds of the computing program. To perform factorization, multiple factorings of a test components are identified and evaluated until a suitable improvement in the maintained performance metric for each corresponding test component is achieved (e.g., via simulation). This may be performed, across multiple of the test components. This process may be iterated through such that the set of test components being factored and evaluated in a subsequent iteration may in fact be a test component created by factorization in a prior iteration. Creation of a factored test component may involve actual creation of the factored test component, or could simply be the tracking of a representation of as yet non-existent test component and its proposed constituent tests, which is what is used to estimate whether the performance metric would be improved.

The net result is that the factorization achieves improvement in performance metrics of the test components. Accordingly, after subsequent iterative builds the testing performance (e.g., speed, complexity, reliability, and the like) may be improved. For large computing programs under build with many interrelated working components, and with many builds leading up to a finished product, this can result in accelerated development of the computer program.

For instance, this factorization may avoid over-testing that can result by executing large numbers of tests for a single test component, when some of the tests may not affect working components that have actually been changed during a build. The avoidance of over-testing also reduces the risk of false positives due to flaky tests that rely on dynamic state changes, which can also invoke the need for needless troubleshooting, only to find that there really is no problem with the computer program. In addition, since the factorization is achieved in the context of component-level regression testing, no further data beyond what is used to build is needed to test the build.

Because the principles described herein operate in the context of a computing system, a computing system will be described with respect to FIG. 1. Then, the principles of factorization will then be described with respect to FIGS. 2 through 4.

Computing systems are now increasingly taking a wide variety of forms. Computing systems may, for example, be handheld devices, appliances, laptop computers, desktop computers, mainframes, distributed computing systems, datacenters, or even devices that have not conventionally been considered a computing system, such as wearables (e.g., glasses, watches, bands, and so forth). In this description and in the claims, the term "computing system" is defined broadly as including any device or system (or combination thereof) that includes at least one physical and tangible processor, and a physical and tangible memory capable of having thereon computer-executable instructions that may be executed by a processor. The memory may take any form and may depend on the nature and form of the computing system. A computing system may be distributed over a network environment and may include multiple constituent computing systems.

As illustrated in FIG. 1, in its most basic configuration, a computing system 100 typically includes at least one hardware processing unit 102 and memory 104. The memory 104 may be physical system memory, which may be volatile, non-volatile, or some combination of the two. The term "memory" may also be used herein to refer to non-volatile mass storage such as physical storage media. If the computing system is distributed, the processing, memory and/or storage capability may be distributed as well.

The computing system 100 has thereon multiple structures often referred to as an "executable component". For instance, the memory 104 of the computing system 100 is illustrated as including executable component 106. The term "executable component" is the name for a structure that is well understood to one of ordinary skill in the art in the field of computing as being a structure that can be software, hardware, or a combination thereof. For instance, when implemented in software, one of ordinary skill in the art would understand that the structure of an executable component may include software objects, routines, methods that may be executed on the computing system, whether such an executable component exists in the heap of a computing system, or whether the executable component exists on computer-readable storage media.

In such a case, one of ordinary skill in the art will recognize that the structure of the executable component exists on a computer-readable medium such that, when interpreted by one or more processors of a computing system (e.g., by a processor thread), the computing system is caused to perform a function. Such structure may be computer-readable directly by the processors (as is the case if the executable component were binary). Alternatively, the structure may be structured to be interpretable and/or compiled (whether in a single stage or in multiple stages) so as to generate such binary that is directly interpretable by the processors. Such an understanding of example structures of an executable component is well within the understanding of one of ordinary skill in the art of computing when using the term "executable component".

The term "executable component" is also well understood by one of ordinary skill as including structures that are implemented exclusively or near-exclusively in hardware, such as within a field programmable gate array (FPGA), an application specific integrated circuit (ASIC), or any other specialized circuit. Accordingly, the term "executable component" is a term for a structure that is well understood by those of ordinary skill in the art of computing, whether implemented in software, hardware, or a combination. In this description, the term "component" may also be used. As used in this description and in the case, this term (regardless of whether the term is modified with one or more modifiers) is also intended to be synonymous with the term "executable component" or be specific types of such an "executable component", and thus also have a structure that is well understood by those of ordinary skill in the art of computing.

In the description that follows, embodiments are described with reference to acts that are performed by one or more computing systems. If such acts are implemented in software, one or more processors (of the associated computing system that performs the act) direct the operation of the computing system in response to having executed computer-executable instructions that constitute an executable component. For example, such computer-executable instructions may be embodied on one or more computer-readable media that form a computer program product. An example of such an operation involves the manipulation of data.

The computer-executable instructions (and the manipulated data) may be stored in the memory 104 of the computing system 100. Computing system 100 may also contain communication channels 108 that allow the computing system 100 to communicate with other computing systems over, for example, network 110.

While not all computing systems require a user interface, in some embodiments, the computing system 100 includes a user interface 112 for use in interfacing with a user. The user interface 112 may include output mechanisms 112A as well as input mechanisms 112B. The principles described herein are not limited to the precise output mechanisms 112A or input mechanisms 112B as such will depend on the nature of the device. However, output mechanisms 112A might include, for instance, speakers, displays, tactile output, holograms, virtual reality, and so forth. Examples of input mechanisms 112B might include, for instance, microphones, touchscreens, holograms, virtual reality, cameras, keyboards, mouse of other pointer input, sensors of any type, and so forth.

Embodiments described herein may comprise or utilize a special purpose or general-purpose computing system including computer hardware, such as, for example, one or more processors and system memory, as discussed in greater detail below. Embodiments described herein also include physical and other computer-readable media for carrying or storing computer-executable instructions and/or data structures. Such computer-readable media can be any available media that can be accessed by a general purpose or special purpose computing system. Computer-readable media that store computer-executable instructions are physical storage media. Computer-readable media that carry computer-executable instructions are transmission media. Thus, by way of example, and not limitation, embodiments can comprise at least two distinctly different kinds of computer-readable media: storage media and transmission media.

Computer-readable storage media includes RAM, ROM, EEPROM, CD-ROM or other optical disk storage, magnetic disk storage or other magnetic storage devices, or any other physical and tangible storage medium which can be used to store desired program code means in the form of computer-executable instructions or data structures and which can be accessed by a general purpose or special purpose computing system.

A "network" is defined as one or more data links that enable the transport of electronic data between computing systems and/or components and/or other electronic devices. When information is transferred or provided over a network or another communications connection (either hardwired, wireless, or a combination of hardwired or wireless) to a computing system, the computing system properly views the connection as a transmission medium. Transmissions media can include a network and/or data links which can be used to carry desired program code means in the form of computer-executable instructions or data structures and which can be accessed by a general purpose or special purpose computing system. Combinations of the above should also be included within the scope of computer-readable media.

Further, upon reaching various computing system components, program code means in the form of computer-executable instructions or data structures can be transferred automatically from transmission media to storage media (or vice versa). For example, computer-executable instructions or data structures received over a network or data link can be buffered in RAM within a network interface component (e.g., a "NIC"), and then eventually transferred to computing system RAM and/or to less volatile storage media at a computing system. Thus, it should be understood that readable media can be included in computing system components that also (or even primarily) utilize transmission media.

Computer-executable instructions comprise, for example, instructions and data which, when executed at a processor, cause a general purpose computing system, special purpose computing system, or special purpose processing device to perform a certain function or group of functions. Alternatively, or in addition, the computer-executable instructions may configure the computing system to perform a certain function or group of functions. The computer executable instructions may be, for example, binaries or even instructions that undergo some translation (such as compilation) before direct execution by the processors, such as intermediate format instructions such as assembly language, or even source code.

Those skilled in the art will appreciate that the invention may be practiced in network computing environments with many types of computing system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, pagers, routers, switches, datacenters, wearables (such as glasses or watches) and the like. The invention may also be practiced in distributed system environments where local and remote computing systems, which are linked (either by hardwired data links, wireless data links, or by a combination of hardwired and wireless data links) through a network, both perform tasks. In a distributed system environment, program components may be located in both local and remote memory storage devices.

Those skilled in the art will also appreciate that the invention may be practiced in a cloud computing environment. Cloud computing environments may be distributed, although this is not required. When distributed, cloud computing environments may be distributed internationally within an organization and/or have components possessed across multiple organizations. In this description and the following claims, "cloud computing" is defined as a model for enabling on-demand network access to a shared pool of configurable computing resources (e.g., networks, servers, storage, applications, and services). The definition of "cloud computing" is not limited to any of the other numerous advantages that can be obtained from such a model when properly deployed.

For instance, cloud computing is currently employed in the marketplace so as to offer ubiquitous and convenient on-demand access to the shared pool of configurable computing resources. Furthermore, the shared pool of configurable computing resources can be rapidly provisioned via virtualization and released with low management effort or service provider interaction, and then scaled accordingly.

A cloud computing model can be composed of various characteristics such as on-demand self-service, broad network access, resource pooling, rapid elasticity, measured service, and so forth. A cloud computing model may also come in the form of various service models such as, for example, Software as a Service ("SaaS"), Platform as a Service ("PaaS"), and Infrastructure as a Service ("IaaS"). The cloud computing model may also be deployed using different deployment models such as private cloud, community cloud, public cloud, hybrid cloud, and so forth. In this description and in the claims, a "cloud computing environment" is an environment in which cloud computing is employed.

Figure 2:
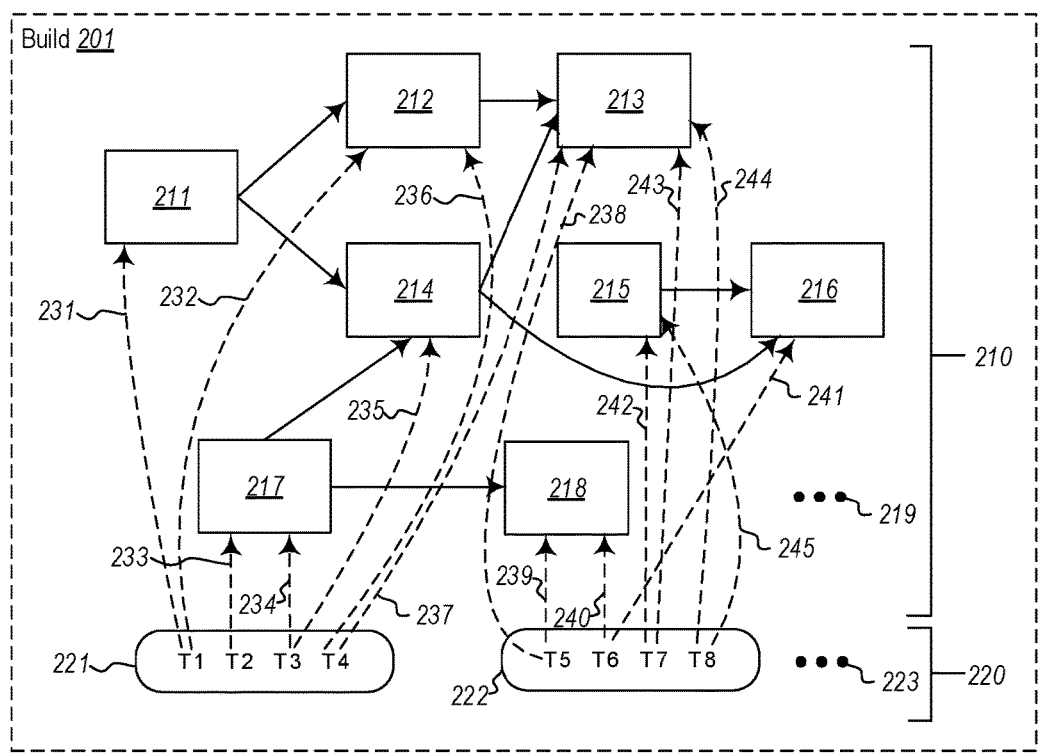
FIG. 2 illustrates an example build system that includes a build and a factorization system, with the build representing one of potentially many incremental builds that a development project goes through in the development of complex software, the building including working components as well as test components.

FIG. 2 illustrates an example build system 200 that includes a build 201 and a factorization system 202. The build system 200 may be, for instance, the computing system 100 of FIG. 1. The build 201 representing an example of one of potentially many incremental builds that an example development project goes through in the development of complex software. The build 201 includes multiple working components 210 and multiple test components 220. After a final build, the application will be deployed with just the working components. However, while the application is being developed, there would be multiple builds of the application. The test components 220 are for purposes of confirming expected performance after each build, and would not be deployed after the final build. The principles described herein are related to the factorization of the test components 220 in such a way as to improve performance of the testing after each build.

The build 201 illustrates just an example build. In this particular example, the working components 210 are illustrated as including eight working components. However, the ellipsis 219 represents that the principles described herein work regardless of the number of working components 210 within the build. In fact, the principles described herein are especially useful when the number of working components 210 is quite large. For instance, large builds may often have thousands of working components, often involving millions of lines of code.

In the example build 201 of FIG. 2, each of the working components is illustrated as having a particular dependency with other working components. Such working dependencies are represented by the solid-lined arrows in FIG. 2. In this description, a working dependency is a dependency that exists between working components and that is manifest or potentially manifest at execution-time of the application. The ellipsis 219 also represents that the principles described herein are not limited to the precise working dependencies that may exist in a particular program. Rather, the principles described herein apply to any program build regardless of its working dependencies. Even a single program may have the number of working components and associated working dependencies change over time from one build to the next. Thus, the illustrated working dependencies are for purposes of example only.

In the illustrated example, at this particular stage in the application development, working component 218 has a working dependency from working component 217. Working component 217 does not have any working dependencies. Working component 216 has a working dependency from working components 214 and 215. Working component 215 also does not have any working dependencies. Working component 214 has a working dependency from both working components 211 and 217. Working component 213 has a working dependency from both working components 212 and 214. Working component 212 has a working dependency from working component 211. Working component 211 does not have any working dependencies.

In this particular example, the test components 220 are illustrated as including two test components 221 and 222. However, the ellipsis 223 represents that the principles described herein work regardless of the number of test components 220 that may be run after a particular build. In this particular example, test component 221 is illustrated as capable of running four tests T1, T2, T3 and T4. Further test component 222 is illustrated as capable of running tests T5, T6, T7 and T8. Again, the ellipses 223 represents that the principles described herein are not limited to the number or type of tests run by any particular test component. The principles described herein apply to factor test components so that the number of test components may increase, but the performance of testing also increases.

Each of the tests T1 through T8 has a test dependency from one or more working components. A "test dependency" means that the test uses data from the corresponding working component during testing. When performing component level-regression testing, a test component is run if it includes a test that has a test dependency on any working component that has either directly changed, or is a descendant (as measured by working dependencies) of a working component that has directly changed.

For instance, if working component 211 was the only working component that changed from one build to the next, then any test that has a test dependency from any of working component 211, or any of its dependent working components 212, 213, 214 and 216 should be run. Thus, test T1 (due to test dependencies 231 and 232), test T3 (due to test dependency 235), test T4 (due to test dependencies 236 and 237), test T5 (due to test dependency 238), test T6 (due to test dependency 241), test T7 (due to test dependency 243), and test T8 (due to test dependency 244) should be run. In other words, all tests but test T2 should be run. Because a test component is run depending on whether any of its constituent tests are run, this would mean that if working component 211 changes, both test components 221 and 222 are run.

Now suppose that working component 212 was the only working component that changed from one build to the next. In that case, any tests that have a test dependency from working component 212 or its working dependent working component 213 should be run. Accordingly, test T1 is run (due to test dependency 232), test T4 is run (due to test dependencies 236 and 237), test T5 is run (due to test dependency 238), test T7 is run (due to test dependency 243) and test T8 is run (due to test dependency 244). Again, test component 221 is run (because it includes tests T1 and T4), and test component 222 is run (because it includes tests T5, T7 and T8). Again, if working component 212 changes, both test components 221 and 222 are run.

Now suppose that working component 213 was the only working component that changed from one build to the next. In that case, any tests that have a test dependency from working component 213 should be run. Accordingly, test T4 is run (due to test dependency 237), test T5 is run (due to test dependency 238), test T7 is run (due to test dependency 243) and test T8 is run (due to test dependency 244). Again, test component 221 is run (because it includes test T4), and test component 222 is run (because it includes test T5, T7 and T8). Thus, if working component 213 changes, both test components 221 and 222 are run.

Now suppose that working component 214 was the only working component that changed from one build to the next. In that case, any tests that have a test dependency from working component 214 or its working dependent working components 213 and 216 should be run. Accordingly, test T3 is run (due to test dependency 235), test T5 is run (due to test dependency 238), test T6 is run (due to test dependency 241) test T7 is run (due to test dependency 243) and test T8 is run (due to test dependency 244). Again, test component 221 is run (because it includes test T3), and test component 222 is run (because it includes tests T5, T6, T7 and T8). Again, if working component 214 changes, both test components 221 and 222 are thus run.

Now suppose that working component 215 was the only working component that changed from one build to the next. In that case, any tests that have a test dependency from working component 215 or its working dependent working component 216 should be run. Accordingly, test T6 is run (due to test dependency 241), test T7 is run (due to test dependency 242) and test T8 is run (due to test dependency 245). Now, finally test component 221 is spared from running (because none of tests T1 through T4 are run). Only test component 222 is to be run (because it includes tests T6, T7 and T8) if working component 215 is the only working component that changed.

Now suppose that working component 216 was the only working component that changed from one build to the next. In that case, any tests that have a test dependency from working component 216 should be run. Accordingly, only test T6 is run (due to test dependency 241). Now, test component 221 is again spared from running (because none of tests T1 through T4 are run). Only test component 222 is to be run (because it includes test T6) if working component 216 is the only working component that changed.

Now suppose that working component 217 was the only working component that changed from one build to the next. In that case, any tests that have a test dependency from working component 217 or its working dependent working components 213, 214, 216 or 218 should be run. Accordingly, test T2 is run (due to test dependency 233), test T3 is run (due to test dependencies 234 and 235), test T4 is run (due to test dependency 237), test T5 is run (due to test dependencies 238 and 239), test T6 is run (due to test dependencies 240 and 241), test T7 is run (due to test dependency 243) and test T8 is run (due to test dependency 244). Again, test component 221 is run (because it includes tests T2, T3 and T4), and test component 222 is run (because it includes tests T5, T6, T7 and T8). Again, if working component 217 changes, both test components 221 and 222 are run.

Now suppose that working component 218 was the only working component that changed from one build to the next. In that case, any tests that have a test dependency from working component 218 should be run. Accordingly, test T5 is run (due to test dependency 239), and test T6 is run (due to test dependency 240). Thus, only test component 222 is to be run (because it includes tests T5 and T6) if working component 218 is the only working component that changed.

Note that in this simple example, both test components 221 and 222 are frequently run after every build. The only time that would not be the case is if none of working components 211, 212, 213, 214 and 217 changed. Whenever a test component is run, all of its constituent tests are run. Thus, even if a test does not have a test dependency from a working component that is to be re-evaluated after a build, that test is still run. This is called "over-testing", and is a side-effect of component-level regression testing. On the other hand, an advantage of component-level regression testing is that no metadata is needed beyond that used for the build itself.

Thus, component-level regression testing scales well in some respects, but not in other respects. For instance, as working components, working dependencies, and test dependencies increase (i.e., the application becomes larger), regression level testing scales well in that the maintained metadata needed to identify tests to run does not increase. In other words, identifying the test components to run is still straightforward. On the other hand, the amount of over-testing tends to increase as the number of unnecessary tests increases. The principles described herein reduces the impact of over-testing, thereby allowing for component-level regression testing to scale better. The reduction in over-testing and overall improvement of test metrics is accomplished by performing factorization of the test components.

Figure 3:
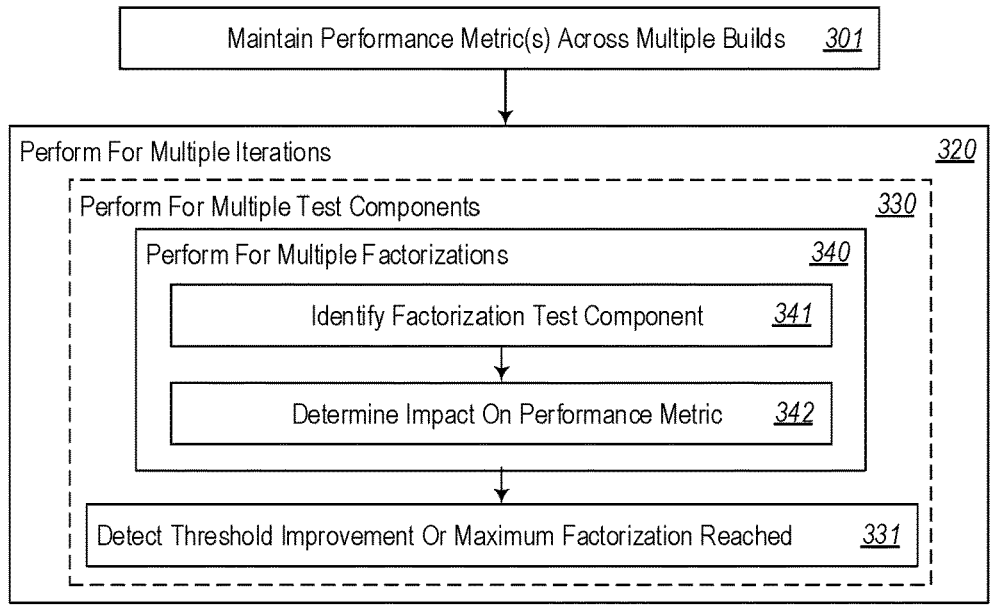
FIG. 3 illustrates a flowchart of a method for selecting factorization of one or more test components in a build system that builds a computer program.

FIG. 3 illustrates a flowchart of a method 300 for selecting factorization of one or more test components in a build system that builds a computer program comprising working components. As an example, the method 300 may be performed in the build system 200 of FIG. 2 by the factorization system 202 in order to factor the test components 221 and 222 of the build 201. By factorization, over-testing is reduced, and performance metrics of the testing itself are improved. This improvement is multiplied in an incremental build in which testing is performed after each build. When the project is large, such can result in significant reduction in computing resources.

The computing system maintains performance metrics for test components across multiple builds of the computer program (act 301). This process may be thought of as a continuous process, and allows stable metrics to be obtained regarding performance of a test component. As an example, the performance metric may be dependent on a single performance metric.

For instance, in one embodiment, there is but a single performance metric, and that performance metric is frequency in running a test component. In that case, factorization of the test component may be performed with the aim to reduce the average frequency of utilization of a test component. For instance, as described above with respect to FIG. 2, the test component 222 is most frequently run since any change to any working component will result in its running. Test component 221 is also quite frequently run since there are limited circumstances in which it would not be run (e.g., only if none of working components 211, 212, 213, 214 and 217 changed since the last build).

The frequency of a test component being run may be determined based on the number of builds that a working component has experienced, an identification of the test dependencies to that working component, as well as an identification of the tests that exist within a test component. The frequency of use of the test component may be determined even for test components that are not yet created based simply on determining what tests might be included within the as-yet non-existent test component. Accordingly, as factorization progresses as described herein, actual factorization of a test component into physical form is not required in order to determine that some improvement in the performance metric would be achieved. Instead, proposed factored components may be tracked from one iteration to the next.

Alternatively, the performance metric may be based on multiple performance metrics of the test components. For instance, another metric might be the expected duration of execution of a test component once it is run. However, because the measuring of performance metric improvement may be a task that is performed many times in the factorization of test components, care should be taken not to make the determination of the performance metric excessively computationally intensive. This is because the examination of various factorizations and their resultant impact on performance metrics may be performed many times (due to the three-levels of looping described below with respect to box 320, 330 and 340).

For instance, the evaluation of various factorizations are performed for potentially multiple factorizations (as represented by box 340) for a given test component and for a given iteration in the factorization. Furthermore, there are multiple test components to consider factorization for (as presented by box 330) even within a given iteration of factorization. Compounding the complexity, there may be multiple iterations of factorization that are performed across the set of test components (as represented by box 320). Thus, it is possible that very many performances of the act of measuring improvement in the maintained performance metric (act 342) may be performed, especially in complex builds. Accordingly, in one embodiment, the performance metric is simply the frequency of anticipated usage of the test component.

As represented by box 340, for each of potentially multiple possible factorizations of a test component, the factorization system identifies a particular factoring of the corresponding test component. Such factorization may be performed by splitting a test components into two of more test components, each of the factored test components containing one or more tests (act 341). Alternatively or in addition, factorization may be achieved by moving a test from one test component to another. The factorization system then determines whether the particular factoring contributes to an improvement in a maintained performance metric for the corresponding test component when performing component-level regression testing (act 342).

This factorization may be performed for any number of possible factorizations of a given test components. For instance, consider the test component 221. There is one way to factor the test component 221 into four different test components (each of course having a single constituent test). There are six ways to factor the test component 221 into three different test components (each of two test components would have a single test, and the remaining test component would have two tests). There are eight ways to factor the test component 221 into two different test components (four ways in which one test component has three tests and the other has only one test, and four ways in which each test component has two tests). Of course, there is the trivial case of factorization in which the test component is not factored at all. Thus, in total, given a test component of four constituent tests, there are 16 total possible factorizations.

If the number of tests in a test component are higher, the number of possible factorizations increases significantly. To reduce this number, there may be constraints placed on factorization. For instance, one of the constraints may force grouping of tests that have test dependencies into a same set of one or more working components. Consider again the example build 200 of FIG. 2, when considering all of possible sets of two working components, tests T2 and T3 may be grouped together because they each have test dependencies from one or more of test components 214 and 217, and from no other test component. Furthermore, tests T7 and test T8 may be grouped together because they each have test dependencies from one or more (both in this case) of test components 213 and 215, and from no other test component.

To further reduce factorization, sets of three or even more test components may be evaluated to determine if there are common sets of tests that have test dependencies only from the test components in each evaluated set of test components. In an example provided herein after, suppose that test components T2 and T3 are grouped together for purposes of applying constraints on possible factorization of test component 221. Suppose further that test components T7 and T8 are grouped together for purposes of applying constraints on the possible factorization of test component 222. These example constraints with hereinafter be referred to as the "example grouping constraint". That said, other constraints may also be applied. For instance, tests that are to be performed atomically as part of a transaction may be grouped together such that they are not executed in different test components.

To further limit the number of factorizations identified (act 341) and evaluated (act 342) in a single iteration and for a given test component, the acts 341 and 342 are repeated (act 331) only until a threshold improvement in the performance metric for the test component has been achieved (act 331). Alternatively or in addition, there may be maximum number of factorizations identified (act 341) and evaluated (act 342) before the factorization system concludes that no further factorization of the test component should be performed in this iteration (or perhaps even in all future iterations). Such application of constraints and iterations are especially helpful to make the task of factorization manageable, especially for test components that have high numbers of constituent tests.

Box 330 represents that this process may be repeated for each test component. However, for subsequent iterations, factorization for test components may be foregone for test components that have already been determined, in a prior iteration or in the current iteration, as being sufficiently factorized. When a suitable factorization is determined for a given test component, the test component might be automatically factorized. Alternatively, perhaps a notation of the factorization is made in memory so that a hypothetically factorized test component may be considered as its own test component for purposes of evaluation in subsequent iterations.

Figure 4A:
FIGS. 4A through 4C illustrate an example incremental factorization of the test components beginning from the example of FIG. 2, and honoring constraints that some tests should be contained within the same testing component.
Figure 4B:
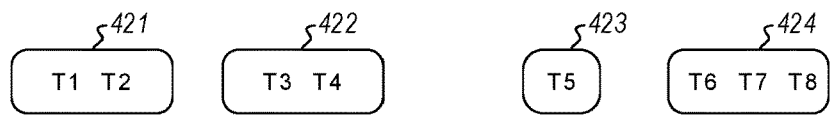
Figure 4C:

Box 320 represents that the factorization may be performed for multiple iterations. FIGS. 4A through 4C illustrate an example of various iterations of factorization in the case of beginning with the test components 221 and 222 of FIG. 2, and applying the example grouping constraint (e.g., in which tests T2 and T3 are not split into factorized test components, and in which tests T7 and T8 are not grouped into factorized test components).

FIG. 4A illustrates the state 400A of the test components 221 and 222 at the beginning of the first iteration. Here, the state 400A is the same as that illustrated in FIG. 2. That is, test component 221 contains tests T1 through T4, and test component 222 contains tests T5 through T8.

After a single iteration, the state 400B may appear as illustrated in FIG. 4B. In this case, test component 221 has been factorized into test component 421 having constituent tests T1 and T4, and test component 422 having constituent tests T2 and T3. Furthermore, the test component 222 has been factorized into test component 423 containing test T5 and another test component 424 containing tests T6, T7 and T8.

In order to further reduce the number of factorizations tested for a given test component in a given iteration, there may be a limit to the number of test components that may be factored from a single test component of a prior iteration. For instance, there might be a limit of a maximum two possible factorized test components that may result from a given test component in a given iteration of the factorization. Imposing such a limit further can further reduce complexity of factorization, especially where test components may contain many constituent tests.

This factorization of test component 221 shown in FIG. 4B (into test components 421 and 422) has been determined to be a suitable factorization after testing one or more or even perhaps all of the other possible permutations for factorization of the test component. For instance, in this case, given the example grouping constraint, there are four other factorizations that are possible. One possible factorization is the trivial factorization in which the test component 221 is left alone with all four tests T1, T2, T3 and T4 remaining in a single test component. A second possible factorization is a factorization in which one test component contains test T1, and another test component contains the remaining three tests T2, T3 and T4. A third possible factorization is a factorization in which one test component contains test T4, and another test component contains the remaining three tests T1, T2 and T3. A fourth possible factorization (assuming there is not a limit of two possible factored components for a given iteration) is a factorization in which one test component contains test T1, a second test component contains test T4, and a third test component contains tests T2 and T3.

Likewise, the factorization of test component 222 shown in FIG. 4B (into test components 423 and 424) has been determined to be a suitable factorization after testing one or more of the other possible permutations for factorization of the test component. For instance, in this case, given the example grouping constraint, there are four other factorizations that are possible. One possible factorization is the trivial factorization in which the test component 222 is left alone with all four tests T5, T6, T7 and T8 remaining in a single test component. A second possible factorization is a factorization in which one test component contains test T6, and another test component contains the remaining three tests T5, T7 and T8. A third possible factorization is a factorization in which tests T5 and T6 are in one test component, and tests T7 and T8 are in another test component. A fourth possible factorization (assuming there is not a limit of two possible factorization for a given iteration) is a factorization in which one test component contains test T5, a second test component contains test T6, and a third test component contains tests T7 and T8. Presumptively, this last factorization was not tested in the first iteration, because it is the factorization that resulted in after the second interaction as shown in state 400C of FIG. 4C.

FIG. 4C illustrates a state 400C of factorization after a second iteration of factorization. As it turns out, test component 421 was not further factorized and remains as is. The factorization may have tested out splitting the test component 421 into two test components, with one test T1 being in one of the test components, and with another test T4 being in another test component, but such did not result in a suitable improvement in the performance metric. Thus, after the second iteration, test component 421 remains as is. Furthermore, test component 422 was constrained against factorization since tests T2 and T3 are to remain within the same test component per the example grouping constraint. Test component 423 could not be further factorized because it contains but a single test T5.

However, test component 424 has been further factorized into test component 425 having a single test T6, and test component 426 having the tests T7 and T8. The factorization system thus tested out splitting the test component 424 into these two test components 425 and 526, and determined that a suitable improvement in the performance metric was (or would be) achieved.

At this point of state 400C, no further iterations would be useful. All test components have the minimum possible tests that honor the example grouping constraint. In complex systems, perhaps a limit is placed on the number of factorization iterations, or on the number of resulting test components. This would help reduce the complexity in identifying factorization. Note that although various iterations of factorization have been described, actual factorization itself may not be performed at all. Instead, the result may be a simple recommendation for factorization. A programmer or team of programmers may choose which factorizations to adopt, and which not to adopt.

The factorization system may also be configurable to reduce the complexity of the factorizations recommended. For instance, the maximum number of factorized test components that result from a single test component in a single iteration may be configurable. The maximum number of iterations may be configurable. The factorization constraints (such as grouping constraints) may be configurable. The maximum time for each iteration may be configurable. The maximum time for generating the factorization recommendations may be configurable. A minimum number of tests per test component may be configurable. A maximum number of recommended factorizations may be configurable. A maximum ratio of recommended factorized test components to original test components may be configurable.

Thus, the principles described herein provide a mechanism for recommendation of factorization of test components in a component-level regression testing environment. The factorization reduced the amount of over-testing that is performed after a build, and further improves the overall performance metric of the testing system after each build. Such over-testing results from wasteful test executions due to tests being placed in test components with more test dependencies than the test itself actually has. Therefore, over-testing causes irrelevant tests to be executed due to changes in any of the developer-specified dependencies of the component. Execution of irrelevant tests can not only waste machine resources, but can severely affect developer productivity if those irrelevant tests are false positives or result from dynamically changing circumstances. Thus, the principles described herein significantly improve the performing of computing systems that operate as build systems.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A computing system comprising:
one or more processors; and one or more computer-readable media having stored thereon computer-executable instructions that are structured such that, when executed by the one or more processors, cause the computing system to perform a method for selecting a factorization of one or more test components in a component-level regression testing system such that it reduces over-testing and improves overall performance of the component-level regression testing system in a build system that builds a computer program comprising working components, the method comprising:

identifying at least one test component in the build system using a build dependency graph of test components that are impacted by a change of at least one working component, wherein the build system comprises a plurality of test components inter-dependent on a plurality of working components, wherein tests are performed using the identified at least one test component while skipping other test components;

maintaining at least one performance metric for each of the plurality of test components across a plurality of builds of the computer program, each of the test components comprising a plurality of distinct tests and each build of the plurality of builds comprising a plurality of working components;

measuring performance of the testing system by factoring at least one of the plurality of test components by splitting the at least one test component, such that number of the plurality of test components increases and as a result performance of the overall testing system increases, wherein the measurement is performed without physically factoring the plurality of test components;

grouping tests together and not factorized further when the tests have common dependencies to one or more working components and no other working components;

concluding factorization when a threshold improvement in the maintained at least one performance metric for the test component has been achieved or a maximum number of factorization has been reached; and determining that the factorization contributes to an improvement in the maintained performance metric for the at least one test component when performing component-level regression testing of one or more builds of the computer program using the at least one factorized test component.

2. The computing system in accordance with claim 1, wherein for the at least one test component, identifying is performed multiple times such that multiple factorings of the at least one test component are identified, determining whether the factoring contributes to an improvement in the maintained performance metric being performed for each of at least some of the multiple factorings of the at least one test component.

3. The computing system in accordance with claim 2, the method comprising the following for each of multiple of the plurality of test components, performing the following:

identifying a corresponding factoring of the at least one test component so that a plurality of tests of the at least one test component are split into multiple sets of test(s); and determining whether the corresponding factoring contributes to an improvement in a maintained performance metric for the at least one test component when performing component-level regression testing.

4. The computing system in accordance with claim 3, method including selecting a factoring corresponding to a highest determined improvement in the performance metric.

5. The computing system in accordance with claim 1, an identified corresponding factoring for one or more of the plurality of test components being different than an identified corresponding factoring for one or more other test components of the plurality of test components.

6. The computing system in accordance with claim 1, each of at least some of the plurality of test components containing a different set of tests.

7. The computing system in accordance with claim 1, the performance metric for the plurality of test components being dependent upon a usage frequency metric of the test components.

8. The computing system in accordance with claim 1, the performance metric for the plurality of test components being dependent upon a testing duration metric of the test components.

9. The computing system in accordance with claim 1, the performance metric for the plurality of test components being dependent upon multiple performance metrics of the test components.

10. The computing system in accordance with claim 1, performing comprising performing the following for each of multiple of the plurality of test components:

identifying a corresponding factoring of the at least one test component so that a plurality of tests of the at least one test component are split into multiple sets of test(s);

determining whether the corresponding factoring contributes to an improvement in a maintained performance metric for the at least one test component when performing component-level regression testing; and repeating identifying and determining for different factorizations to determine a suitable factorization for the test component.

11. The computing system in accordance with claim 10, repeating being performed until a threshold improvement in the performance metric for the test component has been achieved.

12. The computing system in accordance with claim 10, the method further comprising:

automatically factoring the test component based on repeating.

13. The computing system in accordance with claim 10, the method further comprising repeatedly performing the method for multiple interactions such that in subsequent iterations, a test component may be a test component that resulted from a factorization performed in a prior iteration.

14. The computing system in accordance with claim 10, wherein the multiple sets of factorizations for the test component are limited by a set of one or more constraints.

15. The computing system in accordance with claim 14, one of the set of one or more constraints forcing grouping of tests that only have test dependencies a same set of one or more working components.

16. A method for selecting factorization of one or more test components in a component-level regression testing system such that it reduces over-testing and improves overall performance of the component-level regression testing system in a build system that builds a computer program comprising working components, the method comprising:

identifying at least one test component in the build system using a build dependency graph of test components that are impacted by a change of at least one working component, wherein the build system comprises a plurality of test components inter-dependent on a plurality of working components, wherein tests are performed using the identified at least one test component while skipping other test components;

maintaining at least one performance metric for each of the plurality of test components across a plurality of builds of the computer program, each of the test components comprising a plurality of distinct tests and each build of the plurality of builds comprising a plurality of working components;

measuring performance of the testing system by factoring at least one of the plurality of test components by splitting the at least one test component, such that number of the plurality of test components increases and as a result performance of the overall testing system increases, wherein the measurement is performed without physically factoring the plurality of test components;

grouping tests together and not factorized further when the tests have common dependencies to one or more working components and no other working components;

concluding factorization when a threshold improvement in the maintained at least one performance metric for the test component has been achieved or a maximum number of factorization has been reached; and determining that the factorization contributes to an improvement in the maintained performance metric for the at least one test component when performing component-level regression testing of one or more builds of the computer program using the at least one factorized test component.

17. The method in accordance with claim 16, performing comprising performing the following for each of multiple of the plurality of test components:

identifying a corresponding factoring of the at least one test component so that a plurality of tests of the at least one test component are split into multiple sets of test(s); and determining whether the corresponding factoring contributes to an improvement in a maintained performance metric for the at least one test component when performing component-level regression testing.

18. The method in accordance with claim 16, performing comprising performing the following for each of multiple of the plurality of test components:

identifying a corresponding factoring of the at least one test component so that a plurality of tests of the at least one test component are split into multiple sets of test(s);

determining whether the corresponding factoring contributes to an improvement in a maintained performance metric for the at least one test component when performing component-level regression testing; and repeating identifying and determining for different factorizations to determine a suitable factorization for the test component.

19. The method accordance with claim 18, the method being repeatedly performed for multiple iterations such that in subsequent iterations, such that a test component in a subsequent iteration may be a test component that resulted from a factorization performed in a prior iteration.

20. A computer program product comprising one or more hardware computer-readable storage devices having stored thereon computer-executable instructions that are structured such that, when executed by one or more processors of a computing system, cause the computing system to perform a method for selecting factorization of one or more test components in a component-level regression testing system such that it reduces over-testing and improves overall performance of the component-level regression testing system in a build system that builds a computer program comprising working components, the method comprising:

identifying at least one test component in the build system using a build dependency graph of test components that are impacted by a change of at least one working component, wherein the build system comprises a plurality of test components inter-dependent on a plurality of working components, wherein tests are performed using the identified at least one test component while skipping other test components;

maintaining at least one performance metric for each of the plurality of test components across a plurality of builds of the computer program, each of the test components comprising a plurality of distinct tests and each build of the plurality of builds comprising a plurality of working components;

measuring performance of the testing system by factoring at least one of the plurality of test components by splitting the at least one test component, such that number of the plurality of test components increases and as a result performance of the overall testing system increases, wherein the measurement is performed without physically factoring the plurality of test components;

grouping tests together and not factorized further when the tests have common dependencies to one or more working components and no other working components;

concluding factorization when a threshold improvement in the maintained at least one performance metric for the test component has been achieved or a maximum number of factorization has been reached; and determining whether that the factorization contributes to an improvement in the maintained performance metric for the at least one test component when performing component-level regression testing of one or more builds of the computer program using the at least one factorized test component.

* * * * *